United States Patent
Wade

(10) Patent No.: US 7,759,945 B2
(45) Date of Patent: Jul. 20, 2010

(54) SENSOR INCLUDING DUAL RANGE, APPLICATION SPECIFIC INTEGRATED CHIP (ASIC)

(75) Inventor: Richard A. Wade, Wothington, OH (US)

(73) Assignee: Honeywell International Inc., Morristown, NJ (US)

( * ) Notice: Subject to any disclaimer, the term of this patent is extended or adjusted under 35 U.S.C. 154(b) by 86 days.

(21) Appl. No.: 11/894,831

(22) Filed: Aug. 22, 2007

(65) Prior Publication Data

US 2009/0049887 A1    Feb. 26, 2009

(51) Int. Cl.
G01R 19/156    (2006.01)

(52) U.S. Cl. .................. 324/605; 324/607; 73/753; 73/754; 73/57; 73/69; 73/81

(58) Field of Classification Search .................. 73/1.57, 73/1.59, 715–728, 753, 754; 338/2, 4, 36, 338/42; 702/98, 57, 69, 81, 99, 104, 106, 702/107; 324/605, 607
See application file for complete search history.

(56) References Cited

U.S. PATENT DOCUMENTS

| | | | |
|---|---|---|---|
| 3,484,732 A | 12/1969 | Postma | 338/4 |
| 3,970,841 A * | 7/1976 | Green | 250/548 |
| 4,574,640 A | 3/1986 | Krechmery | 73/721 |
| 6,047,244 A * | 4/2000 | Rud, Jr. | 702/98 |
| 6,177,637 B1 * | 1/2001 | Evans | 177/25.13 |
| 6,642,594 B2 * | 11/2003 | Kurtz | 257/419 |
| 7,263,876 B2 * | 9/2007 | Yamazaki et al. | 73/105 |
| 2009/0067684 A1 * | 3/2009 | Mainguet | 382/124 |

FOREIGN PATENT DOCUMENTS

JP    2006197538 A  *  7/2006

OTHER PUBLICATIONS

"Precision Dual Range Pressure Calibrator PPC-3300", Martel Electronics, pp. 1-2, 2002.*
Dual Range Transducer Display, www.celerity.net, Dated Nov. 2006.

* cited by examiner

Primary Examiner—David A. Rogers

(57) ABSTRACT

A sensor incorporates a dual range ASIC (Application Specific Integrated Circuit) for accurately sensing and measuring sensor input over extensive range along with an improved resolution. The sensor can incorporate an ASIC utilizing signals from a MEMS-based piezoresistive Wheatstone bridge. Signals can also come from capacitive pressure measurement sources. The signals can be converted to digital bit counts where calibration coefficients can be implemented to achieve high precision. The calibration coefficients corresponding to bit counts can be compared with transition points that are recorded into ASIC for effectively distinguishing different sensor ranges. The transition points can be stored in an EEPROM fabricated to suit ASIC applications.

20 Claims, 4 Drawing Sheets

SENSOR INCLUDING DUAL RANGE, APPLICATION SPECIFIC INTEGRATED CHIP (ASIC)

TECHNICAL FIELD

Embodiments are generally related to sensors, and more particularly to dual range sensing system. Embodiments are additionally related to ASIC (application specific integration chips) incorporated sensors for dual range transitions.

BACKGROUND OF THE INVENTION

Many processes and devices have been utilized for sensing pressure, temperature, speed, direction, etc., in different applications. Often, requirements exist for measuring these conditions over an extensive range. For example, a highly sensitive pressure sensor, inherently used for measuring low range pressure, is delicate and prone to destruction when subjected to an overload pressure. Conversely, sensors characterized by necessary stiffness to accurately measure high range pressure are insensitive and thereby inaccurate within low pressure ranges. Similarly, pressure responsive devices such as strain gauges and diaphragm capsules linked to dial indicators can be sufficiently strong to measure over extensive pressure range, but are not sensitive enough to accomplish accurate measurements in low pressure ranges.

Although the present invention can be used for various sensors, pressure will be discussed as an exemplary application for the present invention. Pressure is not meant as, and should not be interpreted as, a limitation over the scope of the present invention. The majority of prior art pressure sensors typically include a thin silicon diaphragm which can be stressed in response to an applied pressure. The stress can be measured by piezoresistive elements formed in a diaphragm. The thickness of the diaphragm can be a function of the range of pressure being sensed. Fabricating multiple piezoresistive elements for responding to different pressure ranges is undesirable. Such devices cannot ensure a high level accuracy and internal reliability during extensive pressure range.

There has been an increased demand for a pressure sensor with improved capabilities across a large pressure range. Instead of employing two separate sensors, the industry has widely adopted pressure measuring instruments which can combine both capabilities into a single, unitary element.

In the industry today, pressure sensors which provide dual functions, a sensor which can measure across a large pressure range, are preferred by the users. To meet this need and reduce the financial strain of delivering smaller and smaller accuracy tolerance, a dual range ASIC could be used. An example of an application of this type of ASIC is in an automotive engine lubricating oil system. Currently, the OEMs (Original Equipment Manufacturers) are utilizing oil pressure switches to monitor the oil pressure and ensure that it does not drop below a certain threshold. As the OEM's move to more modern systems of controlling their engines, for instance variable valve timing or cylinder deactivation systems, they need to get the continuous oil pressure. This translates into a high demand for a sensor, which can accurately measure the low-pressure range and then transition to a lower accuracy for higher pressures. In order to provide optimized utilization of pressure sensors across the large pressure range, a dual range ASIC (Application specific integrated chips) can be used which offers high-end accuracy and relatively high precision.

Based on the foregoing, it is believed that the preferred dual range sensor incorporating ASIC can therefore provide an improved sensor for applications requiring input in pressure, speed, temperature and direction, which could accurately measure the input over an extensive range, precisely at the lower range.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved sensor that can be employed over an extensive measurement range.

It is another aspect of the present invention to provide for a sensor that integrates an ASIC (Application Specific Integrated Chip) for dual range transitions.

It is another aspect of the present invention to provide for a pressure sensor that integrates an ASIC that can take an input from a measurand interface device (e.g., piezo-resistive Wheatstone bridge, capacitive diaphragm, optical position, etc.) and provide dual slope capability.

The aforementioned aspects and other objectives and advantages can now be achieved as described herein. An MEMS based sensor that incorporates a dual range ASIC (Application Specific Integrated. Circuit) for accurately sensing and measuring an input (e.g., pressure, temperature, speed, direction) over extensive range along with an improved resolution is disclosed. A sensor incorporating the ASIC can utilizes signals from a pressure measurand interface. These signals can be converted to digital bit counts where calibration coefficients can be implemented to achieve high precision. The calibration coefficients that correspond to bit counts can be compared with transition points that have been recorded into the ASIC for effectively distinguishing different pressure ranges. The transition points can be stored in an EEPROM fabricated to suit ASIC applications.

The preferred embodiment can be realized by putting internal software into an ASIC which permits the ASIC to read the measurand interface (e.g., Wheatstone bridge) and process its signal(s) with one set of correction factors, for example one set of calibration coefficients stored in EEPROM location until specific transition point is reached and then switch in the software to a second set of correction factors, for example a second set of calibration coefficients stored in another EEPROM location to continue outputting the signal, but with a different slope.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

The embodiments described herein can be implemented in the context of a host operating system and one or more modules. Such modules may constitute hardware modules, such as, for example, electronic components of a computer system. Such modules may also constitute software modules. In the computer programming arts, a software "module" can be typically implemented as a collection of routines and data structures that performs particular tasks or implements a particular abstract data type.

Software modules generally include instruction media storable within a memory location of a data-processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term "module" as utilized herein can therefore generally refer to software modules or implementations thereof. Such modules can be utilized separately or together to form a program product that can be implemented through signal-bearing media, including transmission media and/or recordable media. An example of such a module is module 111 depicted in FIG. 1.

Figure 1:
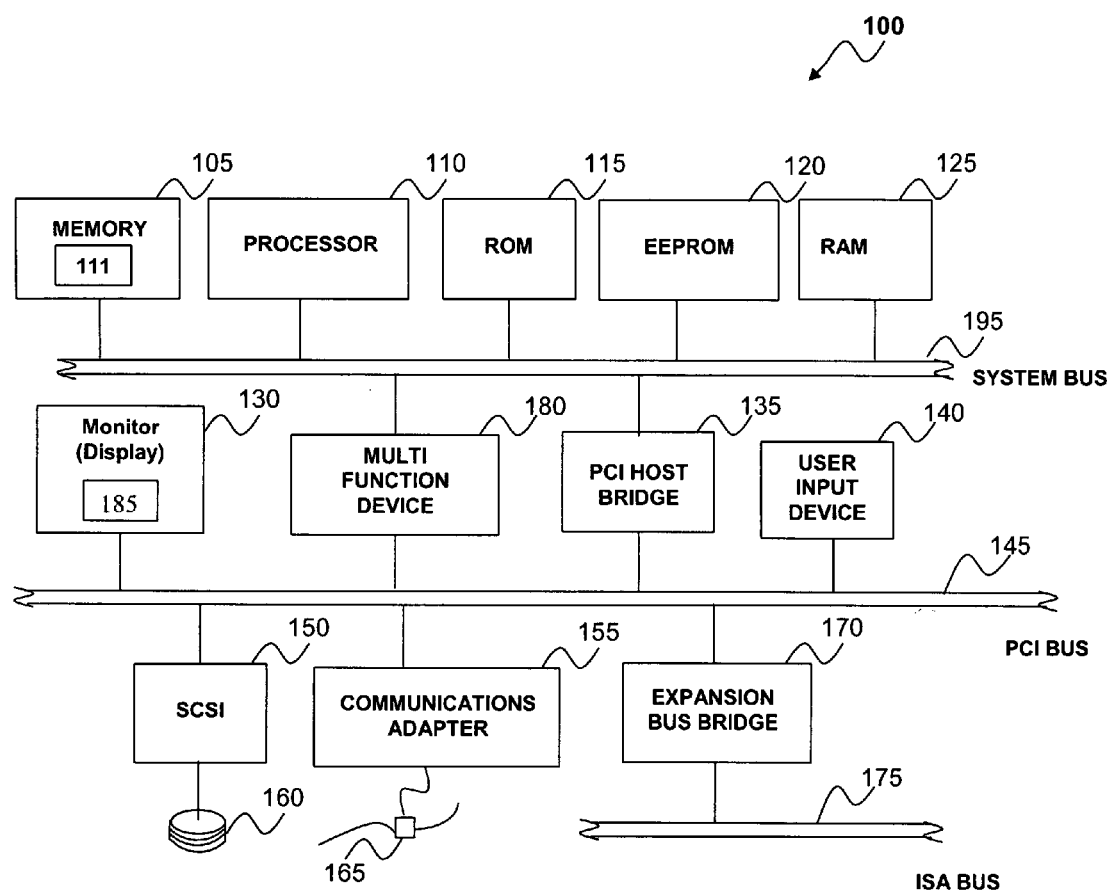
FIG. 1 illustrates a block diagram of an example data-processing apparatus, which can be adapted for use in implementing a preferred embodiment.

Referring to the drawings and in particular to FIG. 1, there is depicted a block diagram of a representative data processing apparatus 100, for example, a computer which can be adapted for use in implementing a dual range sensing methodology described herein can be provided in module 111 as also shown herein, in accordance with a preferred embodiment. As shown in FIG. 1, a memory 105, a processor (CPU) 110, a Read-Only memory (ROM) 115, a Electrically Erasable Programmable Read-Only Memory (EEPROM) 120, and a Random-Access Memory (RAM) 125 are generally connected to a system bus 195 of apparatus 100. Memory 105 can be implemented as a ROM, EEPROM, RAM, a combination thereof, or simply a general memory unit. EEPROM can be fabricated to suit for an ASIC application entitled to store programmable data, for example calibration coefficients and transition point associated with a dual range pressure sensor, although it should be appreciated that other sensor inputs can be used (e.g., temperature, speed, directions). Module 111 includes a dual range sensing software and can be stored within memory 105 and then retrieved and processed via processor 110 to perform a particular task. A user input device 140, such as a scanner, mouse, or another pointing device, can be connected to PCI (Peripheral Component Interconnect) bus 145. A multifunction device 180 such as a process manager can be provided, which can combine several core technologies, including image scanning and so forth into a single unit is generally connected to PCI bus 145.

Data-processing apparatus 100 thus includes CPU 110, ROM 115, and RAM 125, which are also coupled to Peripheral Component Interconnect (PCI) local bus 145 of data-processing apparatus 100 through PCI host-bridge 135. PCI Host Bridge 135 provides a low latency path through which processor 110 may directly access PCI devices mapped anywhere within bus memory and/or input/output (I/O) address spaces. PCI Host Bridge 135 also provides a high bandwidth path for allowing PCI devices to directly access RAM 125.

Also attached to PCI local bus 145 are communications adapter 155, small computer system interface (SCSI) 150, and expansion bus-bridge 170, communications adapter 155 is utilized for connecting data-processing apparatus 100 to a network 165. SCSI 150 is utilized to control high-speed SCSI disk drive 160. Expansion bus-bridge 170, such as a PCI-to-ISA bus bridge, may be utilized for coupling ISA bus 175 to PCI local bus 145. Note that PCI local bus 145 can further be connected to a monitor 130, which functions as a display (e.g., a video monitor) for displaying data and information for a user and for interactively displaying a graphical user interface (GUI) 185.

Note that the term "GUI" generally refers to a type of environment that represents programs, files, options and so forth by means of graphically displayed icons, menus, and dialog boxes on a computer monitor screen. A user can interact with the GUI 185 to select and activate such options by pointing and clicking with a user input device such as, for example, a pointing device such as a mouse, and/or with a keyboard. A particular item can function in the same manner to the user in all applications because the GUI 185 provides standard software routines (e.g., module 111) to handle these elements and reports the user's actions.

It is important to note that, although the embodiments are described in the context of a fully functional data-processing apparatus such as data-processing apparatus 100, those skilled in the art will appreciate that the mechanisms of the present invention are capable of being distributed as a program product in a variety of forms, and that the present invention applies equally regardless of the particular type of pressure range to carry out the processing. The internal software logic can be implemented as a software module, such as the dual range sensing software module 111 depicted in FIG. 1.

Figure 2:
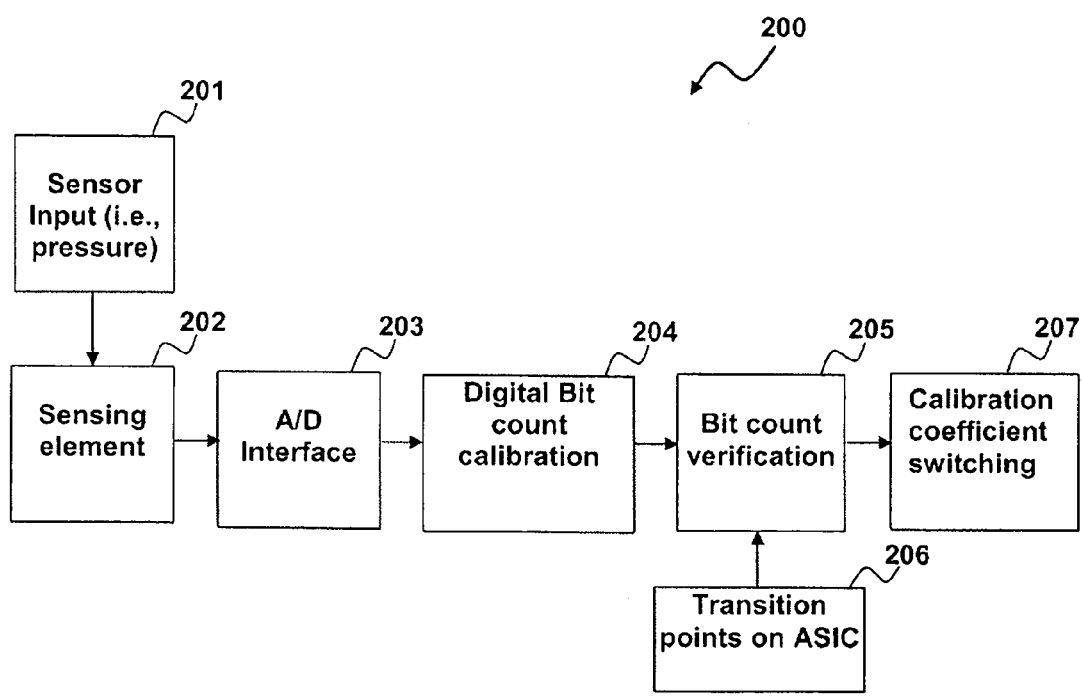
FIG. 2 illustrates a block diagram of a pressure sensor incorporating dual range ASIC, which can be implemented in accordance with a preferred embodiment.

Referring to FIG. 2, a functional block diagram of a pressure sensor 200 with a dual range ASIC (not shown) incorporated for measuring pressure over extensive range, in accordance with a preferred embodiment. A pressure sensor environment is used for exemplary purposes only as it can be appreciated that other sensor means (e.g., temperature, speed, direction, light, etc.) can be utilized with a dual range ASIC in accordance with features of the present invention. The pressure sensor 200 includes a sensing element 202, which can be provided in the form of a MEMS based piezoresistive Wheatstone bridge. Although it should be appreciated that other measurand interfaces can be utilized such as capacitive diaphragms, optical positioning, etc. The input pressure 201 can be applied to the sensing element 202. The sensing element 202 reads data representative of input pressure 201 in analog electrical signal format at desired points in time. This pressure change causes a deflection of a membrane (not shown) in the sensing element 202 and as a result deflection to resistance change occurs. An analog-to-digital (A/D) interface 203 is coupled to the sensing element 202 which can be used to generate equivalent data in digital format. Digital bit counts generated through A/D interface 203 are calibrated to generate digital bit count calibration coefficients 204. The bit count verification 205 can be carried out against transition points set on ASIC 206 and digital bit count calibration coefficient 204. If the calibration coefficient 204 is found to be within current transition point set on ASIC 206, pressure input 201 designated to be within current pressure range. Otherwise, calibration coefficient switching 207 and/or input resolution switching can be performed to facilitate sensing over another pressure range based on another calibration coefficient 204 and/or another input resolution. A pressure sensing element 202 provides appropriate strain management.

Figure 3:
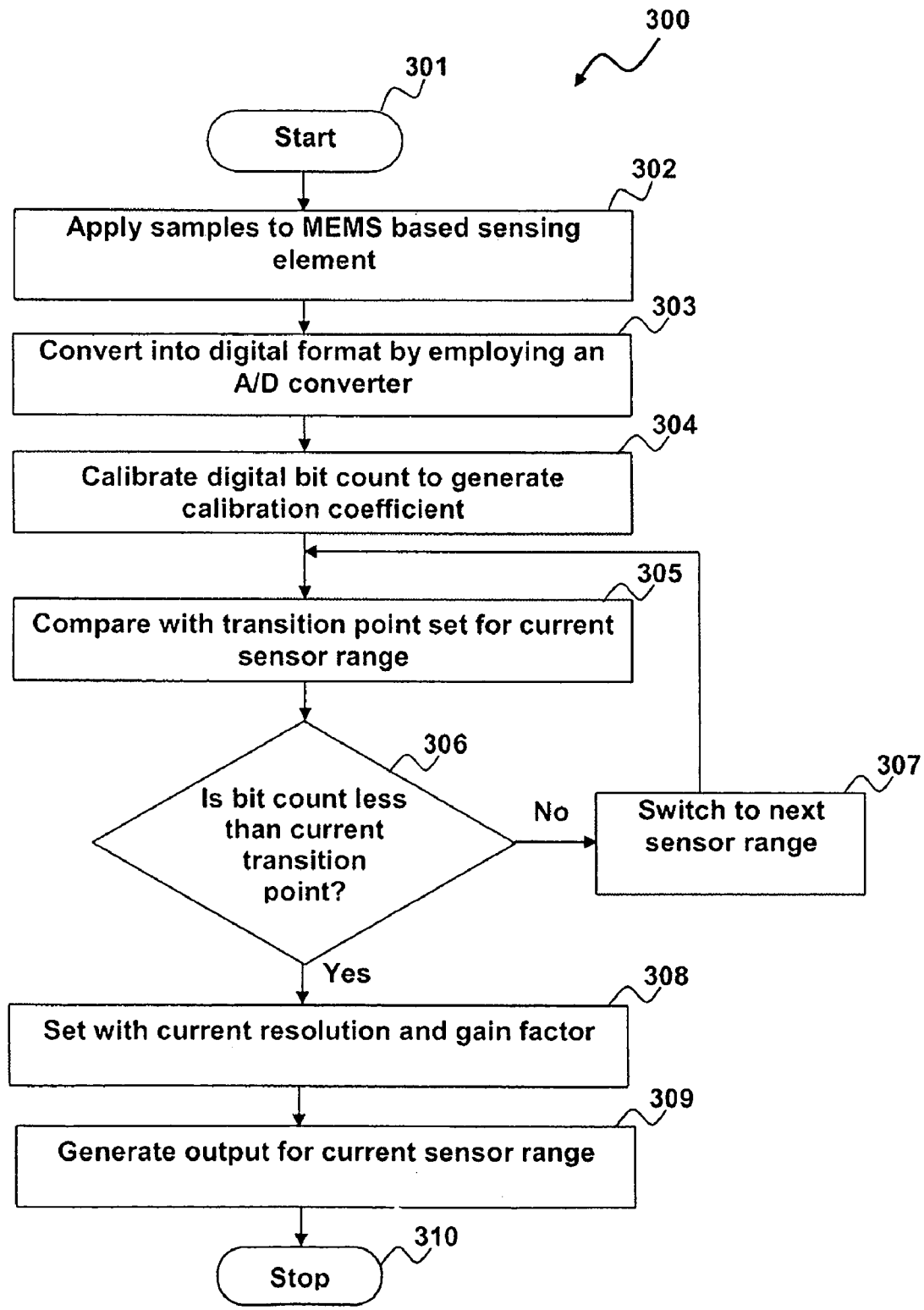
FIG. 3 illustrates a high level flow chart of operations illustrating logical operational steps of a method for sensing pressure over extensive pressure range utilizing dual range ASIC, which can be implemented in accordance with an alternative embodiment.

Referring to FIG. 3, a high level flow chart of operations illustrating logical operational steps of a method 300 for sensing pressure over extensive pressure range utilizing dual range ASIC is illustrated, which can be implemented in accordance with an alternative embodiment. The pressure sensing process can be initiated, as indicated at block 301. Thereafter, as indicated at block 302, the input pressure 201 can be applied to pressure sensing element 202 as shown in FIG. 2. Next, as indicated at block 303 the electrical signals from the sensing element 202 can be converted to digital bit counts utilizing an A/D interface 203. Thereafter, as depicted at block 304, the digital bit counts can be calibrated to generate calibration coefficients. As described at block 305, each calibration coefficient can be compared with a preset transition point recorded in the ASIC to determine the range of input pressure 201. Next, as described at block 306, if the calibration coefficient is less than the transition point as depicted at block 305, the input pressure 201 can be treated within current pressure range and current resolution and gain factor can be set, as indicated at block 308. Next, as depicted at block 309, the output pressure for current pressure range can be generated.

As indicated at block 307, if the digital bit counts generated for input pressure 201 is not corresponding to current transition point, the sensor 200 can accordingly switch to other calibration coefficients and/or input resolution preset for next pressure range. Thereafter, as indicated at bock 305, digital bit count is compared with current transition point and subsequently operational steps 306, 307, 308, and 309 can be performed recursively for accurately measuring input pressure 201. The process can be terminated by an action as indicated at block 310.

Figure 4:
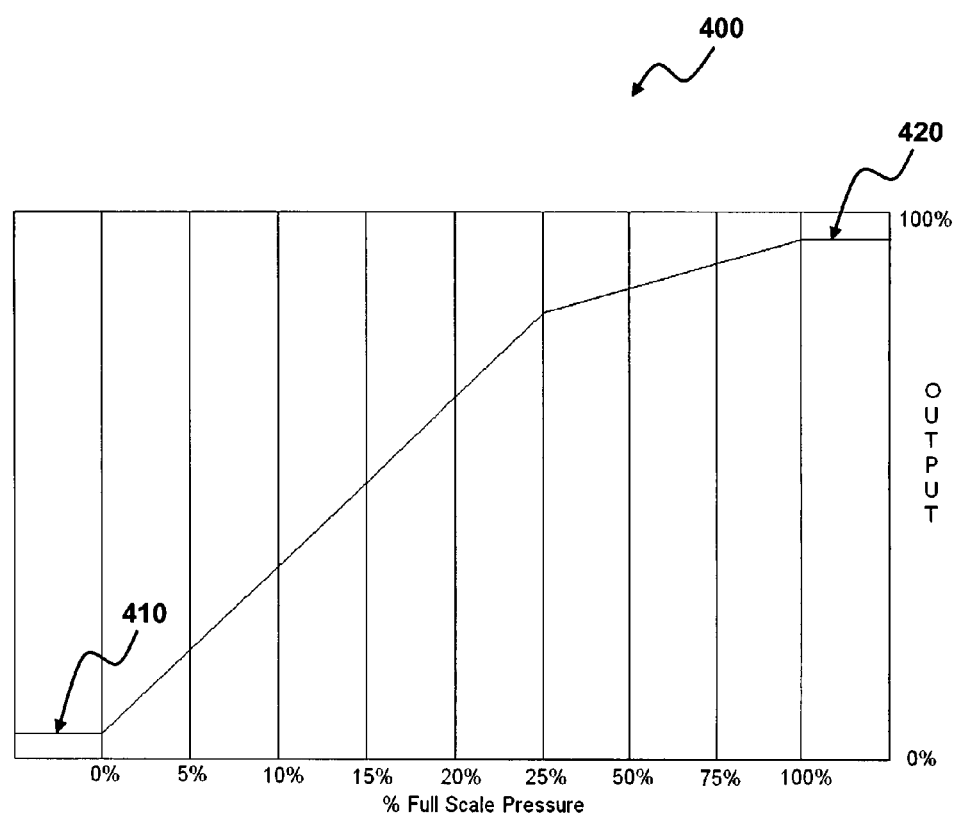
FIG. 4 illustrates a graph of a transfer function for an analog pressure sensor and the influence of a new ASIC versus the typical analog output signal.

Referring to FIG. 4 illustrated is a graph 400 of a transfer function for an analog pressure sensor and the influence of a new ASIC versus the typical analog output signal. An ASIC-based sensor will operate from conditions of no pressure 410 to full pressure 430 along a larger range of the pressure spectrum as shown by transition point 420.

The salient features of the preferred embodiment include a pressure sensor incorporating dual range ASIC for measuring one pressure range with high accuracy and transition to other pressure range with relatively lower resolution. The preferred embodiment can be realized by applying the software logic into an ASIC where a set of correction factors can be set to determine the system performance. The preferred embodiment can be effectively utilized for generating continuous output signal corresponding to pressure over extensive pressure range, but with varying slope and accuracy. The pressure sensor is inexpensive to produce and can be processed in association with integrated circuits on a wafer that may contain a few hundred to a few thousand sensing elements.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A dual range sensor comprising:
   a sensing element for sensing a sensed parameter, the sensing element providing an analog output signal that is related to a current sensed parameter value;
   an analog-to-digital converter coupled to the sensing element, the analog-to-digital converter converting the analog output signal of the sensing element to a digital value; and
   a processing element coupled to the analog-to-digital converter, the processing element comparing the digital value to a transition value and, if the digital value reported by the analog-to-digital converter is less than the transition value, the processing element provides a digital output signal that relates to the digital value and corresponds to a first range of the sensed parameter at a first resolution, and if the digital value reported by the analog-to-digital converter is greater than the transition value, the processing element provides a digital output signal that relates to the digital value and corresponds to a second range of the sensed parameter at a second resolution, wherein the first range of the sensed parameter is not the same as the second range.

2. The dual range sensor of claim 1, wherein the sensing element includes a piezoresistive element connected in a Wheatstone bridge.

3. The dual range sensor of claim 1, further comprising a memory coupled to the processing element, wherein the memory stores the transition value.

4. The dual range sensor of claim 1, wherein the digital-to-analog converted and the processing element are part of an application specific integrated circuit (ASIC).

5. The dual range sensor of claim 1, further comprising a graphical user interface coupled to the processing element, wherein the graphical user interface is configured to display a measure that is related to the digital output signal.

6. The dual range sensor of claim 1, wherein the sensing element includes a pressure sensor, and the processing element includes a processor.

7. The dual range sensor of claim 1, further comprising a memory coupled to the processing element, wherein the memory stores a first set of calibration coefficients and a second set of calibration coefficients.

8. The dual range sensor of claim 7, wherein the processing element uses the first set of calibration coefficients when the digital value reported by the analog-to-digital converter is less than the transition value, and the second set of calibration coefficients when the digital value reported by the analog-to-digital converter bit count is greater than the transition value.

9. The dual range sensor of claim 1, wherein a first gain factor is applied in generating the digital output signal when the digital value reported by the analog-to-digital converter is less than the transition value, and a second gain factor is applied in generating the digital output signal when the digital value reported by the analog-to digital converter is greater than the transition value.

10. The dual range sensor of claim 9, wherein the first gain factor is different from the second gain factor.

11. A method of sensing a sensed parameter in a dual range manner, the method comprising:
    sensing a sensed parameter using a sensing element;
    outputting an analog signal from the sensing element that is related to a current sensed parameter value;
    converting the analog signal to a digital value with an analog-to-digital converter, the digital value represented as a number of digital bits;
    comparing the digital value to a transition value;

providing a digital output signal that relates to the digital value and corresponds to a first range of the sensed parameter at a first resolution when the digital value reported by the analog-to-digital converter is less than the transition value; and providing a digital output signal that relates to the digital value and corresponds to a second range of the sensed parameter at a second resolution when the digital value reported by the analog-to-digital converter is greater than the transition value, wherein the first range of the sensed parameter is not the same as the second range.

12. The method of claim 11, wherein the sensing element includes a piezoresistive element connected in a Wheatstone bridge.

13. The method of claim 11, further comprising displaying a measure related to the digital output signal on a graphical user interface.

14. The method of claim 11, wherein the measure related to the digital output signal is displayed on a graph on the graphical user interface.

15. The method of claim 11, further comprising:
applying a first gain factor to obtain the digital output signal when the digital value reported by the analog-to-digital converter is less than the transition value;
applying a second gain factor to obtain the digital output signal when the digital value reported by the analog-to-digital converter is greater than the transition value.

16. The method of claim 15, wherein the first gain factor is different from the second gain factor.

17. A method of sensing a pressure with a dual range sensor, the method comprising:
sensing a pressure with a pressure sensing element, the sensing element providing a analog output signal corresponding to the sensed pressure; and
generating a digital output signal corresponding to the sensed pressure, wherein the digital output signal has a first resolution when the analog output signal falls within a first range of values, and has a second resolution when the analog output signal falls within a second range of values, wherein the first resolution is different from the second resolution.

18. The method of claim 17, wherein the pressure sensing element includes a piezoresistive element connected in a Wheatstone bridge.

19. The method of claim 17, wherein the generating step includes converting the analog output signal to a digital signal, and comparing a value of the digital signal to a transition value.

20. The method of claim 19, further comprising:
providing a digital output signal that relates to the digital value and corresponds to the first range of the sensed parameter at the first resolution when the value of the digital signal is less than the transition value; and
providing a digital output signal that relates to the digital value and corresponds to the second range of the sensed parameter at the second resolution when the value of the digital signal is greater than the transition value.

* * * * *